(12) United States Patent
Louwe et al.

(10) Patent No.: US 12,410,108 B2
(45) Date of Patent: Sep. 9, 2025

(54) NOx REMOVAL FROM GASEOUS EFFLUENTS

(71) Applicant: YARA INTERNATIONAL ASA, Oslo (NO)

(72) Inventors: Robertus Louwe, Porsgrunn (NO); Patrycja Kita, Poznań (PL); Lene Sund, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 890 days.

(21) Appl. No.: 17/045,165

(22) PCT Filed: Apr. 5, 2019

(86) PCT No.: PCT/EP2019/058604
§ 371 (c)(1),
(2) Date: Oct. 3, 2020

(87) PCT Pub. No.: WO2019/193137
PCT Pub. Date: Oct. 10, 2019

(65) Prior Publication Data
US 2021/0147308 A1   May 20, 2021

(30) Foreign Application Priority Data

Apr. 6, 2018 (EP) .................................... 18166040

(51) Int. Cl.
*C05B 11/04* (2006.01)
*B01D 11/04* (2006.01)
(Continued)

(52) U.S. Cl.
CPC .............. *C05B 11/06* (2013.01); *B01D 11/04* (2013.01); *B01D 53/1431* (2013.01);
(Continued)

(58) Field of Classification Search
CPC ......... C05B 11/06; C05B 11/04; C05B 11/08; B01D 53/56; B01D 53/1431; B01D 53/1456; B01D 53/346; B01D 53/76
See application file for complete search history.

(56) References Cited

U.S. PATENT DOCUMENTS 3,528,797 A   9/1970   Funk et al.
4,119,702 A   10/1978  Azuhata
(Continued)

FOREIGN PATENT DOCUMENTS

CH   129011 A    12/1928
CN   1377722 A   11/2002
(Continued)

OTHER PUBLICATIONS

Chinese Office Action (with English translation) for App. No. CN201980021102.2, dated Nov. 25, 2021, 23 pages.
(Continued)

*Primary Examiner* — Wayne A Langel
(74) *Attorney, Agent, or Firm* — DILWORTH IP, LLC

(57) ABSTRACT

The present application relates to a process for the reduction of NOx from a gaseous effluent generated in the production of fertilizer comprising the acid digestion of phosphate ore in the presence of urea, wherein said gaseous effluent generated has a NOx composition of 70 to 100 mole % $NO_2$ and 0 to 30 mole % NO, comprising the steps of: a) contacting said gaseous effluent for 0.5 to 15 seconds with ozone, thereby providing a resultant gas mixture wherein NO and $NO_2$ present in the NOx are oxidized to higher nitrogen oxides; and; b) removing higher nitrogen oxides from said resultant gas mixture; wherein urea is present during said acid digestion of phosphate ore in an amount of 0.25 wt % or less based on the weight of said phosphate ore;
(Continued)

and; ozone is added to said gaseous effluent in an ozone/NOx ratio ranging between 0.5 and 1.4.

15 Claims, 2 Drawing Sheets

(51) Int. Cl.
  *B01D 53/14* (2006.01)
  *B01D 53/34* (2006.01)
  *B01D 53/56* (2006.01)
  *B01D 53/76* (2006.01)
  *B01D 53/78* (2006.01)
  *C05B 11/06* (2006.01)
  *C05B 11/08* (2006.01)

(52) U.S. Cl.
  CPC ....... *B01D 53/1456* (2013.01); *B01D 53/346* (2013.01); *B01D 53/56* (2013.01); *B01D 53/76* (2013.01); *B01D 53/78* (2013.01); *C05B 11/04* (2013.01); *C05B 11/08* (2013.01)

(56) References Cited

U.S. PATENT DOCUMENTS

| | | | |
|---|---|---|---|
| 4,834,787 A * | 5/1989 | Ratliff | C05B 11/08 423/63 |
| 5,232,584 A | 8/1993 | Wang | |
| 5,985,223 A | 11/1999 | Saxena et al. | |
| 6,641,638 B1 * | 11/2003 | Lueck | C05C 5/02 423/393 |
| 2005/0084436 A1 | 4/2005 | Suchak et al. | |
| 2008/0230484 A1 | 9/2008 | Burnham | |
| 2017/0173525 A1 * | 6/2017 | Suchak | B01D 53/1456 |

FOREIGN PATENT DOCUMENTS

| | | |
|---|---|---|
| CN | 101711943 A | 5/2010 |
| CN | 101913967 A | 12/2010 |
| CN | 101915146 A | 12/2010 |
| CN | 102168852 A | 8/2011 |
| CN | 102355934 A | 2/2012 |
| CN | 103028320 A | 4/2013 |
| CN | 103212281 A | 7/2013 |
| CN | 103341306 A | 10/2013 |
| CN | 103429313 A | 12/2013 |
| CN | 103961991 A | 8/2014 |
| CN | 105964119 A | 9/2016 |
| DE | 3824465 A1 | 1/1990 |
| EA | 005631 B1 | 4/2005 |
| EP | 0351613 A2 | 1/1990 |
| RU | 2271856 C2 | 3/2006 |
| RU | 2411065 C1 | 2/2011 |
| WO | 2016180676 A1 | 11/2016 |

OTHER PUBLICATIONS

International Search Report and Written Opinion issued in International Application No. PCT/EP2019/058604, Issued Aug. 2, 2019, 13 pages.
RU Office Action (including English translation) issued in App. No. RU2020136376/04, dated Oct. 5, 2022, 19 pages.
O. V. Kemer, Methods for solving problems in the course of general chemistry: educational and methodological manual / O. V. Kemer, T. A. Antipova. Ulyanovsk: UVAU GA, 2007, 72 pages.
Big School Encyclopedia. Chemistry, Russian Encyclopedic Partnership, Moscow, 2004, 9 pages.

* cited by examiner

NOx REMOVAL FROM GASEOUS EFFLUENTS

TECHNICAL FIELD

The present application relates to the technical field of NOx removal from gaseous effluents, more in particular the removal of NOx from gaseous effluents generated in the production of fertilizer.

BACKGROUND

During the production of fertilizers, $NO_x$ gases are formed as an unwanted side product. As $NO_x$ can lead to acid rain formation several solutions have already been provided for reducing the production of NOx in these industrial processes.

While the addition of urea is a well-known method of reducing $NO_x$ emissions, the addition of urea leads to an increased $N_2O$ emission, $N_2O$ being a greenhouse gas, affecting global warming much more than $CO_2$. The effect of these gases on global warming is expressed by a global-warming potential or GWP value for each gas, indicating how many times the impact of 1 ton $CO_2$ needs to be multiplied by to have the same impact as 1 ton of that gas and this for a period of 100 years after the gas has been released in the atmosphere. For $N_2O$, the $GWP_{(100\ years)}$ is equal to 298. As a result industry is looking for alternative methods for reducing $NO_x$ that do not increase the emission of other environmentally harmful gases or chemicals.

As $NO_2$ is the main component of the $NO_x$ that is released by fertilizer production, typically for the nitro phosphate process, especially the $NO_2$ needs to be eliminated from the gaseous effluent produced by fertilizer production before the gaseous effluent can be released in the atmosphere. Gaseous effluents from fertilizer plants are relatively cold and typically also comprise dust particles, acid droplets, hydrofluoric acid and water, all of which can cause complications.

In U.S. Pat. No. 5,985,223 the removal of $SO_x$ and $NO_x$ from a gaseous effluent generated by a metal pickling process is described. The $NO_x$ is composed of 60 to 65 vol % of NO and 35-40 vol % of $NO_2$. The gaseous effluent is first passed through a first alkaline scrubber to remove at least part of the $NO_2$ before oxidation is carried out using ozone. The gaseous effluent is subsequently passed through a second alkaline scrubber to remove the $N_2O_5$ which is formed by oxidation of $NO_2$ with the ozone. The passage through the first scrubber makes the $NO_x$ composition richer in NO.

In US 2005/084436 a process is disclosed for removing contaminants from a gas stream including those originating from any full or partial combustion source, thermal processes, and process off gases from fossil fuel fired boilers, furnaces, incineration plants, refining, petroleum and petrochemical plants, inorganic, organic, fine and bulk chemical production plants. The process comprises the subsequent steps of feeding the gas stream into a prescrubber, feeding the gas stream from the prescrubber and an ozone stream into an oxidizer zone, feeding the gas stream from the oxidizer zone to a first scrubber and then feeding the gas stream from the first scrubber into a second scrubber.

The disadvantage of these systems is that two scrubbers are used which makes the removal of $NO_x$ from a gaseous effluent complex and economically unattractive. Furthermore, such an installation takes up a lot of space, making it difficult to adapt existing plants.

A single scrubber process is described in WO 2016/180676 where the removal of $NO_x$ from a gaseous effluent generated in the production of fertilizer is accomplished using ozone to oxidize NO and $NO_2$ present in the $NO_x$ to higher nitrogen oxides and passing the resultant gas mixture through a wet scrubber to remove the higher nitrogen oxides. It has however been observed that the addition of ozone to the effluent gasses is not sufficient to sufficiently reduce the $NO_x$ emissions in the gaseous effluents from the fertilizer production.

It is an object of the present application to provide in a simple method for sufficient reduction of the $NO_x$ present in the gaseous effluent originating from fertilizer production.

SUMMARY

According to a first aspect of the present application, relates to a process for the reduction of NOx from a gaseous effluent generated in the production of fertilizer comprising the acid digestion of phosphate ore in the presence of urea, wherein said gaseous effluent generated has a $NO_x$ composition of 70 to 100 mole % NO2 and 0 to 30 mole % NO, comprising the steps of:
 a) contacting said gaseous effluent for 0.5 to 15 seconds with ozone, thereby providing a resultant gas mixture wherein NO and NO2 present in the $NO_x$ are oxidized to higher nitrogen oxides; and;
 b) removing higher nitrogen oxides from said resultant gas mixture; wherein urea is present during said acid digestion of phosphate ore in an amount of 0.25 wt % or less based on the weight of said phosphate ore; and; ozone is added to said gaseous effluent in an ozone/NOx ratio ranging between 0.5 and 1.4.

In a particular embodiment of the method as disclosed herein said higher nitrogen oxide comprises $N_2O_5$.

In a particular embodiment of the method as disclosed herein step b) is performed using a wet scrubber.

In a particular embodiment of the method as disclosed herein said wet scrubber is an aqueous acidic scrubber.

In a particular embodiment of the method as disclosed herein said gaseous effluent comprises sulphur oxides, water vapour, hydrogen fluoride, silicon tetrafluoride, nitric acid and/or carbon dioxide dust.

In a particular embodiment of the method as disclosed herein the scrubber in step b) is the only scrubber used for the removal of NOx from said gaseous effluent.

In a particular embodiment of the method as disclosed herein nitric acid or a salt thereof is formed in step b).

In a particular embodiment of the method as disclosed herein the temperature in step a) is 130° C. or less.

In a particular embodiment of the method as disclosed herein a gas analyser measures the concentration of NOx in the gaseous effluent and regulates the amount of ozone added to the gaseous effluent in step a) on the basis of the NOx concentration measured.

According to a second aspect the present application relates to the use of ozone and urea as additives in the removal of NOx from gaseous effluents generated in the production of fertilizer comprising the acid digestion of phosphate ore, wherein the gaseous effluent generated in the production of fertilizer has a NOx composition of 70 to 100 mole % NO2 and 0 to 30 mole % NO.

In a particular embodiment of the use as disclosed herein urea is added to the acid digestion of phosphate ore and ozone is added to the gaseous effluents generated from said acid digestion of phosphate ore.

In a particular embodiment of the use as disclosed herein urea is present during said acid digestion of phosphate ore in an amount of 0.25 wt % or less based on the weight of said phosphate ore.

In a particular embodiment of the use as disclosed herein ozone is used in a molar ratio of ozone over NOx in the gaseous effluent of 0.5 to 1.4.

According to a further aspect the present application relates to a fertilizer production plant comprising:
- a reactor (1) for acid digestion of phosphate comprising a gas outlet;
- a wet scrubber (9) configured to receive an NOx-containing gaseous effluent produced in the reactor (1); and;
- a connection line (5) connecting the gas outlet of the reactor (1) with the wet scrubber (9);
- characterized in that said fertilizer production plant further comprises:
  (a) a urea storage silo connected to said reactor (1); and;
  (b) an ozone generator (3) connected to said connection line (5) configured to inject ozone into the gaseous effluent at the injection point (8).

In a particular embodiment of the fertilizer production plant as disclosed herein further comprising a gas analyser (14) positioned before and/or after the ozone injection point (8) and/or at the gaseous effluent of said wet scrubber (12), said gas analyser (14) being configured to analyse at least part of the composition of the gaseous effluent and control the ozone injection on the basis of the NOx concentration measured.

DETAILED DESCRIPTION

Figure 1:
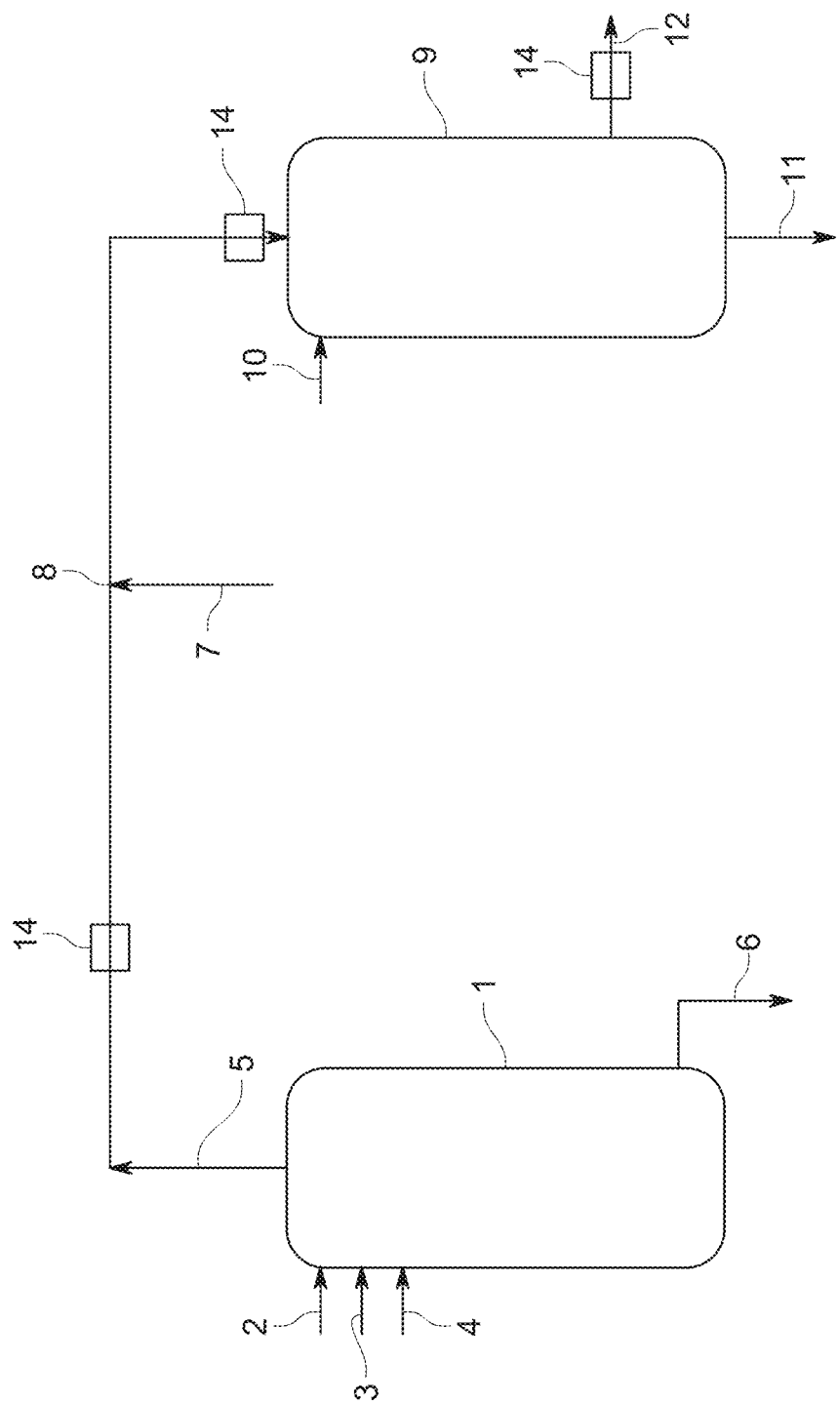
FIG. 1 shows a schematic representation of an exemplary set-up of a fertilizer production plant applying the digestion of phosphate rock with nitric acid as disclosed herein.

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Disclosed herein is a method for the removal of NOx from the gaseous effluent (also referred to as the off-gas) generated in fertilizer production, more preferably NPK fertilizer production, in particular the gaseous effluent of a reactor where phosphate ore is subjected to acid digestion. The method as disclosed herein is in particular characterized in that in the process both urea and ozone are used as additives to remove NOx. Urea is added in particular to the reactor where the phosphate ore is digested and this is combined with the use of ozone to treat the gaseous effluent and oxidize NO and $NO_2$ present in the NOx to higher nitrogen oxides which are then removed from the gas mixture.

The term "fertilizer" as used herein refers to a material from an at least partially synthetic origin that is intended to be applied to soil or plants to supply one or more plant nutrients. The fertilizer can be of the single nutrient type, for example a nitrate salt, or from the multi-nutrient type. Examples of multi-nutrient type fertilizers are: NP fertilizers preferably monoammonium phosphate or diammonium phosphate, NK fertilizers preferably potassium nitrate, PK fertilizers preferably a monopotassium phosphate or dipotassium phosphate, or NPK fertilizer, comprising nitrogen, phosphorus and potassium compounds.

The term "gaseous effluent" refers to gas molecules, dust particles, droplets that are released from and during a chemical or physical process, in particular during the acid digestion of phosphate ore.

The term "NOx" as used herein refers to the sum of all the mono-nitrogen oxides present in the gaseous effluent. The following chemical formulas are used:
NO, meaning nitrogen oxide;
$NO_2$, meaning nitrogen dioxide;
$NO_3$, meaning nitrogen trioxide;
$N_2O_3$, meaning dinitrogen trioxide;
$N_2O_4$, meaning dinitrogen tetroxide;
$N_2O_5$, meaning dinitrogen pentoxide.

The term "higher nitrogen oxides" as used herein refers to nitrogen oxides as product from an oxidation reaction wherein the nitrogen atom has a higher oxidation state than the nitrogen atom in the reagent. The term is always relative to the reagent that is oxidized. For example, $N_2O_5$, where the nitrogen atom has an oxidation state of +5, is a higher nitrogen oxide of $NO_2$, where the nitrogen atom has an oxidation state of +4, and $NO_2$ is a higher nitrogen oxide of NO, where the nitrogen atom has an oxidation state of +2.

The term "contacting" means adding one gas mixture to another and letting the two gas mixture mix with each other. This can be achieved by injecting one gas mixture in the other. The mixing can be passively, by the turbulence caused by the addition of the gas, or actively, where a mechanical movement causes the gasses to mix with each other.

The particular combined use of a low amount of urea and ozone in the process results in a flue gas mixture where NOx can be removed efficiently and in a safe manner, while at the same time no additional environmentally harmful gases or chemicals such as $N_2O$ are emitted.

Without the use of urea in the process, the reaction between phosphate rock and nitric acid occurs without or with a small amount of $N_2O$ being generated, but the production of NOx is uncontrolled due to the autocatalytic nature of the reactions leading to NOx. This leads to a situation where the addition of ozone to the gaseous effluent needs to be extremely and even unrealistically high in order to sufficiently remove NOx.

It has now been observed that the addition of only a small amount of urea in the acid digestion of phosphate rock significantly reduces the generation of NOx while keeping the generation of $N_2O$ at surprisingly low levels. This allows the addition of ozone to the gaseous effluent to further remove NOx at significantly lower dosages compared to the situation without urea addition in the acid digestion of the phosphate rock.

Accordingly, in a first aspect the present application relates to a process for the reduction of $NO_x$ from a gaseous effluent generated in the production of fertilizer comprising the acid digestion of phosphate ore in the presence of urea, wherein said gaseous effluent generated has a NOx composition of 70 to 100 mole % $NO_2$ and 0 to 30 mole % NO, comprising the steps of:
 a) contacting said gaseous effluent for 0.5 to 15 seconds with ozone, thereby providing a resultant gas mixture wherein NO and $NO_2$ present in the NOx are oxidized to higher nitrogen oxides; and;
 b) removing higher nitrogen oxides from said resultant gas mixture; wherein urea is present during said acid digestion of phosphate ore in an amount of 0.25 wt % or less based on the weight of said phosphate ore; and; ozone is added to said gaseous effluent in an ozone/NOx ratio ranging between 0.5 and 1.4.

As referred to herein, acid digestion of phosphate ore, also referred to as phosphate rock, is a well-known process in the production of fertilizers. Phosphate ore is treated with nitric acid. The process can be represented by reaction (I):

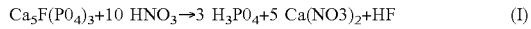

$$Ca_5F(PO_4)_3 + 10\ HNO_3 \rightarrow 3\ H_3PO_4 + 5\ Ca(NO_3)_2 + HF \quad (I)$$

NOx is released during this reaction as a main side product. While NOx will be removed further downstream from the acid digestion of phosphate ore using ozone, it has now been found that the presence of a small amount of urea is required during the acid digestion of phosphate ore. Without the use of urea in the process, the reaction between phosphate rock and nitric acid occurs in an uncontrolled manner due to the autocatalytic nature of the reactions leading to NOx, leading to an uncontrollable amount of NOx in the gaseous effluent and consequently more difficulties downstream for removing NOx. The addition of a small amount of urea during the acid digestion of phosphate ore, in particular urea in an amount of 0.1 wt % or less based on the weight of said phosphate ore, has been shown to reduce the amount of NOx in the gaseous effluent while only insignificant amounts of additional environmentally harmful gases or chemicals such as $N_2O$ are emitted at the same time.

In a particular embodiment of the method as disclosed herein, urea is present during said acid digestion of phosphate ore in an amount ranging between 0.001 wt % and 0.25 wt % based on the weight of the phosphate ore, in particular apatite. More in particular, the amount of urea ranges between 0.001 wt % and 0.15 wt % or between 0.001 wt % and 0.10 wt %, preferably between 0.005 wt % and 0.080 wt %, more preferably between 0.010 wt % and 0.070 wt %, more preferably between 0.020 wt % and 0.060 wt %, and more preferably about 0.050 wt %.

NOx is released during reaction (I) as a main side product, the NOx typically having a composition with a high amount of $NO_2$, typically of 70 to 100 mole % $NO_2$ and 0 to 30 mole % NO, preferably 80 to 100 mole % $NO_2$ and 0 to 20 mole % NO, more preferably 90 to 95 mole % $NO_2$ and 5 to 10 mole % NO. It is noted here that the urea does not affect the ratio of $NO/NO_2$ in the NOx composition. The NOx of the effluent gasses of the methods as disclosed herein are typically different from other chemical processes where NOx is released. For instance, combustion of fossil fuels in the presence of air produces a NOx composition with large amounts of NO (up to 95 mole %) and small amounts of $NO_2$ (up to 5 mole %); Pickling metals releases NOx with a larger $NO_2$ amount (up to 35-40 mole %) and up to 60-65 mole % NO; The production of nitric acid releases NOx comprising around 50 mole % NO and 50 mole % $NO_2$. Hence, for the gaseous effluent released during fertilizer production with a NOx composition of at least 70 mole % $NO_2$, and other impurities preferably dust, droplets, hydrogen fluoride, silicon tetrafluoride and large amounts of water vapor, different reaction conditions are needed for an effective removal of NOx from the gaseous effluent.

Theoretically, ½ mole of ozone is needed to convert one mole of $NO_2$ into $N_2O_5$. The simplified mechanism of the process can be represented by the following reactions (II-V):

$$NO + O_3 \rightarrow NO_2 + O_2 \quad (II)$$

$$NO_2 + O_3 \rightarrow NO_3 + O_2 \quad (III)$$

$$NO_2 + NO_3 \leftrightarrow N_2O_5 \quad (IV)$$

$$N_2O_5 + H_2O \rightarrow HNO_3 \quad (V)$$

Hence a NOx composition with a high percentage $NO_2$ needs less ozone than a NOx composition with a large fraction of NO. In practice, an excess of ozone is needed to obtain a satisfying conversion from NOx to higher nitrogen oxides. These higher nitrogen oxides are more soluble and/or more reactive with water. Hence, these higher nitrogen oxides can be easily removed from the gaseous effluent, for instance using with a wet scrubber.

Accordingly, in a particular embodiment of the method as disclosed herein said higher nitrogen oxide comprises dinitrogen pentoxide or $N_2O_5$. $N_2O_5$ reacts with water to form nitric acid, and can therefore be removed from the gas phase as the nitric acid is dissolved by the water in a scrubber. $N_2O_5$ is the oxide of nitrogen with a fast reaction rate or high solubility, and is therefore the most preferred oxide for fast removal of nitrogen oxides from a gaseous effluent.

As referred to in the method as disclosed herein, ozone is added to the gaseous effluent in an ozone/NOx ratio ranging between 0.5 and 1.4. While using a large excess of ozone, for example more than two equivalent, will oxidize all the NOx present in the gaseous effluent, the unreacted ozone will still need to be destroyed before the gaseous effluent can be released in the atmosphere, this because ozone is harmful to humans and other living organisms, affects the respiratory system and is a greenhouse gas itself. Overall, using a large excess of ozone is not cost efficient, as resources and energy need to be used to produce ozone that largely will be destroyed without being used in a desired chemical reaction. The majority of the ozone produced is to push the oxidation reaction of NOx to completion. This puts extra pressure on the environment as more resources and energy need to be used for as well production and destruction of ozone. Therefore, the amount of ozone needed to oxidize NOx in the gaseous effluent needs to be optimized to make the whole removal process economical and environmentally viable. By controlling the NOx generation, the addition of low amounts of urea, in particular less than 0.25 wt % or less than 0.15 wt %, preferably less than 0.10 wt % or between 0.005 wt % and 0.080 wt %, more preferably between 0.010 wt % and 0.070 wt %, more preferably between 0.020 wt % and 0.060 wt %, and more preferably about 0.050 wt %, based on the weight of the phosphate rock, thus contributes in controlling the amount of ozone needed to oxidize NOx and in making the whole process economically and environmentally viable.

The exact amount of ozone that needs to be used cannot be deduced based on the NOx composition alone, other elements preferably other components in the gaseous effluent and external factors preferably humidity and external temperature need to be taken into account. The ozone is contacted to the gaseous effluent in a molar ratio of ozone over NOx in the gaseous effluent of 0.5 to 1.4, preferably 0.7 to 1.4, more preferably 0.9 to 1.3, most preferably 0.9 to 1.2 and typically 1.0. Molar ratios in this region are an equilibrium between enough ozone to drive the oxidation of NOx forward in the presence of all the other components in the gaseous effluent and minimizing the amount of ozone that needs to be generated and is not used in the oxidation reaction itself. The excess of ozone after the oxidation needs to be removed from the gaseous effluent requesting energy and resources. This and the fact that the ozone needs to be generated at first makes the use of a large excess of ozone cost-inefficient.

The amount of excess ozone that is needed in practice compared to the theoretical amount cannot be deduced from other NOx compositions. The excess depends on other components present in the gaseous effluents, some of these components can be oxidized as well or interfere with the oxidation of NOx. The amount of water vapor in the gaseous effluent, the amount of dust particles, the temperature of the gaseous effluent all have an impact on the speed and yield of the oxidation reaction. Furthermore, the composition of the gaseous effluent is not a constant, fluctuations in NOx and other components can vary quite significantly during one process. Especially for batch processes, the composition of the gaseous effluent at the beginning of the process is completely different from the composition at the end of the process. Also, the removal of NOx from the gaseous effluent needs to be robust, meaning that external factors preferably air humidity and external temperature don't disturb the efficacy of the removal process. Changes in external factors cannot lower the efficacy of the removal of NOx in the gaseous effluent under preferably 70% %, more preferably under 75%, even more preferably under 80% and most preferably under 85%. Efficacy is expressed as the percentage of mole NOx that has been removed from the gaseous effluent over the moles NOx that were initially present.

The treatment of phosphate rock with nitric acid as described above is the preferred process for the production of NP or NPK fertilizer, as in one reaction phosphate as well as nitrate salt are formed simultaneously. The main drawback is however the amounts of NOx that are produced during this process. The use of sulphuric acid in the digestion of phosphate ore does not produce NOx, but it produces one equivalent of gypsum, also referred to as phosphogypsum, as it comes from the digestion of phosphate ore. This phosphogypsum has economically no value, even more because of weakly radioactive nature of phosphogypsum special precautions need to be taken in the disposal of it and most of the time the phosphogypsum is landfilled. Hence again, the use of nitric acid for at least partially replacing sulphuric acid in the digestion of phosphate ore is preferred.

Accordingly, in particular for the acid digestion of phosphate ore in the method as described herein, nitric acid is used to digest the phosphate ore. In another preferred embodiment, the dissolution or digestion of phosphorous containing rocks is carried out by treatment with nitric acid or nitric acid in combination with other acids, typically, but not exclusively phosphoric acid or sulphuric acid. This process is called the mixed acid digestion process. However, preferably the digestion of phosphate ore occurs with nitric acid as the only acid.

Preferably the phosphate ore referred to in the method as disclosed herein is apatite. The digestion of phosphate ore is one of the main processes to obtain phosphate for fertilizer production, especially in the production of NP and NPK fertilizers. The main source of phosphate ore is apatite, and preferably this apatite is treated with nitric acid.

As referred to in step (b) of the method as disclosed herein, higher nitrogen oxides such as $N_2O_5$ are removed from the resultant gas mixture obtained from step (a). In a particular embodiment a wet scrubber used in this process, preferably a scrubber using reclaimed water or a scrubber with an acidic medium. The advantage thereof is that the gaseous effluent can be directly treated in the method without any purification steps in advance. Another advantage is that the method can be carried out in almost every existing wet scrubber modified in that an ozone injection point is fitted in the gaseous effluent supply line to the scrubber. If a pre-treatment was needed, large structures will need to be positioned between the source of the gaseous effluent and the scrubber. This makes it difficult to modify existing installations.

In an advantageous process embodiment according to the method as disclosed herein, the medium used in the wet scrubber is reclaimed water, meaning water that have been used before. More preferably the water has been used to clean at least parts of the fertilizer production plant, preferably reactors, pipes or the floors of the plant. Salts and other components related to fertilizer production will be dissolved in said water. Most preferably, the reclaimed water is acidic. In an advantageous process embodiment according to the method as disclosed herein, the wet scrubber is an acidic wet scrubber. A first advantage of using an acidic solution in the scrubber is that not all the acidic components that are present in the gaseous effluent generated in fertilizer production will react and/or be absorbed by the medium. The gaseous effluent comprises large amounts of carbon dioxide, hydrochloric acid, hydrofluoric acid or silicon tetrafluoride. The acidic medium will still absorb the higher nitrous oxides, but less side products will be formed in the acidic medium. Eventually this results in less medium that needs to be used in the scrubber and less side products that needs to be disposed of. In a possible embodiment according to the method as disclosed herein, the gaseous effluent comprises at least one of the following list: water vapor, hydrogen fluoride, silicon tetrafluoride, nitric acid or dust. The gaseous effluent preferably comprises at least one of the following list: water vapor, hydrogen fluoride, silicon tetrafluoride, nitric acid, carbon dioxide or dust.

During the passage of the resultant gas mixture through the wet scrubber, preferably nitric acid is formed as shown in reaction (VI). If any unreacted $NO_2$ is present at this stage, the $NO_2$ will form a mixture of nitrous and nitric acid as shown in reaction (VII).

$$N_2O_5 + H_2O \rightarrow 2\ NO_3 \tag{VI}$$

$$2\ NO_2 + H_2O \rightarrow 2\ HNO_3 \tag{VII}$$

In a preferred process embodiment according to the method as disclosed herein, the scrubber in step b) is the only scrubber used for the removal of NOx from the gaseous effluent. This has the advantage that only one scrubber needs to be installed. It reduces the running costs of the removal of NOx as only one scrubber needs to be maintained and provided with water or scrubbing solution. This also reduces the amount of water or scrubbing solution that needs to be treated or purified after it has fulfilled its role in the scrubber. The solution provided is cost effective and environmentally friendly.

In an embodiment of the method as disclosed herein, nitric acid, nitrous acid or a salt thereof is formed in step b). The formation of nitric acid, nitrous acid or a salt hereof has the advantage that these species have a high solubility in water and therefor can be removed effectively from the gaseous effluent by a wet scrubber. The water comprising the components can be used as an acid solution or the salts can be used as fertilizer.

In a preferred process embodiment according to the method as disclosed herein, the temperature at which the gaseous effluent comprising NOx is contacted with ozone is 130° C. or less, more preferably 110° C. or less, even more preferably 100° C. or less and most preferably 80° C. or less.

In the process as disclosed herein, the time between the gaseous effluent being mixed with the ozone of step a) and the removal of the higher nitrogen oxides of step b) is 0.5 to 15 seconds, preferably 0.5 to 10 seconds, preferably 0.5 to 5 seconds, more preferably 0.5 to 4 seconds, most preferably 0.5 to 3 seconds, typically 2 seconds. The contact time as referred to in the method according to the present application is related to the flow rate of the gaseous effluent and the distance between the injection point where ozone is added to the gaseous effluent and the point where the gaseous effluent enters the device for removing the higher nitrogen oxides.

In a preferred embodiment of a process as disclosed herein, the temperature in step a) is 130° C. or less, preferably less than 70° C., more preferably less than 50° C. and the contact time is 0.5 to 5 seconds.

A temperature below 130° C. reduces the destruction of ozone. Therefore more ozone is available for oxidation of NOx. At lower temperatures less ozone needs to be generated to obtain the same efficacy of the removal of NOX from the gaseous effluent. A higher temperature also pushes the reaction equilibrium towards the reagents side, promoting the decomposition of $N_2O_5$ back towards $NO_2$.

In a preferred process embodiment according to the method as disclosed herein, a gas analyser measures the concentration of NOx in the gaseous effluent and regulates the amount of ozone added to the gaseous effluent in step a) on the basis of the NOx concentration measured. Measuring the concentration of NOx in the gaseous effluent determines the amount of NOx present in the gaseous effluent at a certain point in time. This information is used to determine how much ozone needs to be added to the gaseous effluent at that point in time. This has the advantage that at any point in time the correct amount of ozone is added to the gaseous effluent so that a certain ratio of moles of ozone to the moles of NOx is maintained. This prevents the over or under dosing of ozone, preventing ozone spillage or incomplete oxidation of the NOx.

A second aspect provides in the use of ozone and urea as additives in the removal of NOx from gaseous effluents generated in the production of fertilizer comprising the acid digestion of phosphate ore, wherein the gaseous effluent generated in the production of fertilizer has a NOx composition of 70 to 100 mole % $NO_2$ and 0 to 30 mole % NO.

In a preferred use as referred to herein, urea is added to the acid digestion of phosphate ore and ozone is added to the gaseous effluents generated from said acid digestion of phosphate ore. In particular, urea is present during said acid digestion of phosphate ore in an amount of 0.25 wt % or less based on the weight of said phosphate ore. In particular, urea is present during said acid digestion of phosphate ore in an amount ranging between 0.001 wt % and 0.25 wt % based on the weight of the phosphate ore, in particular apatite. More in particular, the amount of urea ranges between 0.001 wt % and 0.15 wt % or between 0.001 wt % and 0.10 wt %, preferably between 0.005 wt % and 0.080 wt %, more preferably between 0.010 wt % and 0.070 wt %, more preferably between 0.020 wt % and 0.060 wt %, and more preferably about 0.050 wt %.

In a preferred use as referred to herein, NOx is removed from a gaseous effluent generated in the fertilizer production by means of oxidation by ozone of NO and $NO_2$ present in the NOx to higher nitrogen oxides, providing in a resultant gas mixture, and scrubbing the resultant gas mixture by means of a wet scrubber thereby removing the higher nitrogen oxides NOx gets oxidized by ozone to higher nitrogen oxides. These higher nitrogen oxides are more water soluble and can be removed easily by a wet scrubber.

The ozone is used in a molar ratio of ozone over NOx in the gaseous effluent of 0.5 to 1.4, preferably 0.7 to 1.4, more preferably 0.9 to 1.3, most preferably 0.9 to 1.2 and typically 1.0.

Molar ratios in this region are an equilibrium between enough ozone to drive the oxidation of NOx forward in the presence of all the other components in the gaseous effluent and minimizing the amount of ozone that needs to be generated and is not used in the oxidation reaction itself. The excess of ozone after the oxidation needs to be removed from the gaseous effluent requesting energy and resources. This and the fact that the ozone needs to be generated at first makes the use of a large excess of ozone cost-inefficient.

In a preferred use as referred to herein, the gaseous effluent comprising the oxidation products of NOx is fed to a wet scrubber. The oxidation products of NOx are higher nitrogen oxides, preferably $N_2O_5$. These higher nitrogen oxides are much more water soluble than NO and $NO_2$.

A second aspect provides in a fertilizer production plant comprising:
  a reactor (1) for acid digestion of phosphate comprising a gas outlet;
  a wet scrubber (9) configured to receive an NOx-containing gaseous effluent produced in the reactor (1); and;
  a connection line (5) connecting the gas outlet of the reactor (1) with the wet scrubber (9);
  characterized in that said fertilizer production plant further comprises:
  (a) a urea storage silo connected to said reactor (1); and;
  (b) an ozone generator (3) connected to said connection line (5) configured to inject ozone into the gaseous effluent at the injection point (8).

Preferably, the fertilizer production plant as disclosed herein further comprising a gas analyser (14) positioned before and/or after the ozone injection point (8) and/or at the gaseous effluent of said wet scrubber (12), said gas analyser (14) being configured to analyse at least part of the composition of the gaseous effluent and control the ozone injection on the basis of the NOx concentration measured.

In the example provided in FIG. 1, a fertilizer production plant as disclosed herein is shown. This fertilizer production plant comprises:
  a reactor (1) for acid digestion of phosphate comprising a gas outlet;
  a wet scrubber (9) configured to receive an NOx-containing gaseous effluent produced in the reactor (1); and;

a connection line (5) connecting the gas outlet of the reactor (1) with the wet scrubber (9);

wherein an ozone generator (7) is connected to the connection line (5), configured to inject ozone into the gaseous effluent at the injection point (8).

Preferably, a gaseous effluent that can be formed in the reactor (1) can only leave the reactor (1) via the gas outlet. A connection line (5) connects the gas outlet to a wet scrubber (9) in a way that a gaseous effluent that can be formed inside the reactor (1) can reach a wet scrubber (9). Reactor (1) can be filled with phosphate ore (3), nitric acid (5) and urea (2) needed in the fertilizer production process and is foreseen with an overflow (6), preventing reactants or reaction mixture to enter into the gas outlet.

An ozone generator (7) is connected to the connection line (5), and this in a way that the ozone that can be generated by the ozone generator (7) can be injected into the connection line (5) where the ozone can mix and react with the gaseous effluent that can travel through the connection line (5).

The ozone generator (7) makes it possible to oxidize the NOx to higher nitrogen oxides. The length of the connection line (5) between where the ozone is injected (8) and the gas inlet of the wet scrubber (9) determines together with the flow rate of the gaseous effluent the reaction time or residence time. The time between the gaseous effluent being mixed with the ozone and the entry in the wet scrubber is. In other words, the resident time is the time between the gaseous effluent being mixed with the ozone and the entry in the wet scrubber. Preferably, the length of the connection line (5) is designed such that the residence time is 0.5 to 15 seconds, preferably 0.5 to 10 seconds, preferably 0.5 to 5 seconds, more preferably 0.5 to 4 seconds, most preferably 0.5 to 3 seconds and typically 2 seconds. This way preferably 70%, more preferably 80%, even more preferably 90% and most preferably 100% of the NOx are oxidized to a higher nitrogen oxide by the time the gaseous effluent reaches the wet scrubber (9). The wet scrubber (9) makes it possible to remove the higher nitrogen oxides efficiently from the gaseous effluent as these higher nitrogen oxides have a high solubility in the scrubber medium (10) or react with the water in the scrubber medium (10) to form water soluble salts or acids. The scrubber medium (10) comprising the nitric acid or salt can leave the wet scrubber (9) via medium outlet (11). Overall, with the fertilizer production plant as disclosed herein can be used for the production of fertilizer, and more preferably the digestion of phosphate ore with no or strongly reduced NOx emissions. Preferably 70%, more preferably 80%, even more preferably 90% and most preferably 100% of the NOx are removed from the gaseous effluent that is generated in fertilizer production and leaves the production plant via final effluent (12).

Preferably, a gas analyzer (14) is present before and/or after the injection point (8), and/or at the final effluent (12), and is configured to analyze at least part of the composition of the gaseous effluent and control the ozone injection on the basis of the NOx concentration measured. Preferably the gas analyzer (14) is positioned at the final effluent (12) as this is the place where the effluent gasses have been scrubbed and the gas analyzer (14) works optimally.

The gas analyzer (14) makes it possible that at least the concentration of NOx is determined in the gaseous effluent that can be produced in the reactor (1). This information can be used to control the amount of ozone that is generated by the ozone generator (7) and is injected in the gaseous effluent. This way a predetermined ratio of ozone to NOx can be maintained, and is always the right amount of ozone present in the gaseous effluent and is less ozone wasted at point that the concentration of NOx in the gaseous effluent drops.

Figure 2:
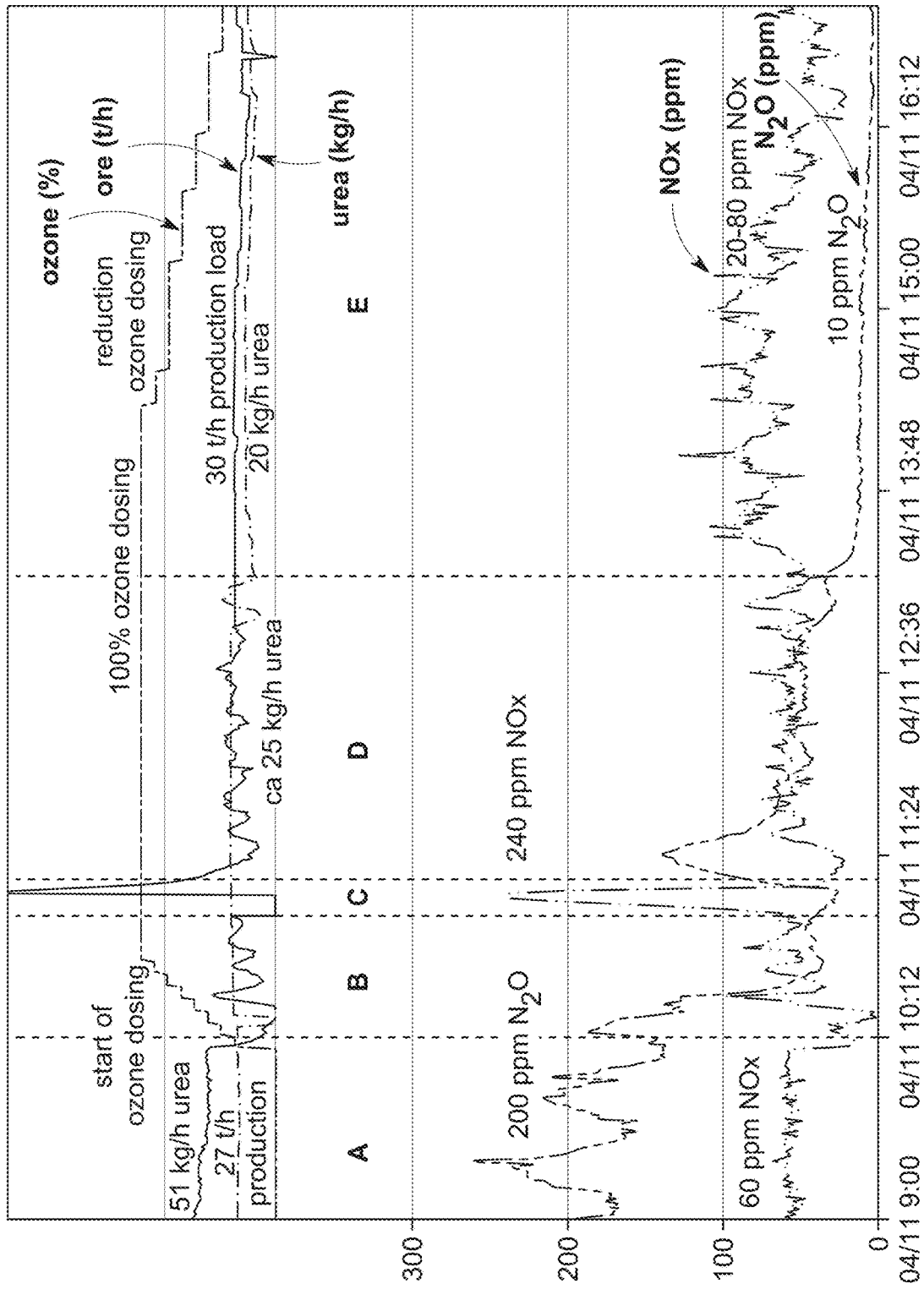
FIG. 2 shows a graph demonstrating the advantageous effect of the combined use of urea and ozone on the NOx and $N_2O$ emissions in fertilizer production.

The advantages of the combined use of ozone and urea are demonstrated in FIG. 2, wherein the composition of the gaseous effluent of the acidic digestion of phosphate rock is shown in the presence or absence of urea and/or ozone. The upper part of the graph shows the different amounts of ozone, phosphate rock and urea, while the bottom part of the graph represents the NOx and $N_2O$ concentration in the gaseous effluent.

Initially, acid rock (27 t/h) was digested in the presence of urea (51 kg/h), without ozone addition (FIG. 2, A). This resulted in NOx emissions of about 60 ppm and $N_2O$ emissions around 200 ppm (ca. 150-250 ppm). Part A thus shows that urea addition can be used to control the NOx emissions at the expense of high amounts of $N_2O$.

In a second phase (FIG. 2, B), ozone addition to the gaseous emissions was started and gradually increased, and urea addition was reduced. The NOx emissions could be maintained at about 60 ppm, while the $N_2O$ emissions were reduced significantly to around 40 ppm.

In a third phase (FIG. 2, C), urea addition was stopped. In the absence of urea, $N_2O$ levels were further reduced. However, NOx emissions rise sharply (up to 240 ppm). Such NOx levels would require excessive amounts of ozone to oxidize and remove in a wet scrubber.

In a fourth phase of the test run (FIG. 2, D), at a NOx level of about 240 ppm, urea addition was restarted (about 25 kg/h), and the production plant and its emissions stabilized.

Final stable operation (FIG. 2, E) was achieved by adding 20 kg/h urea (i.e. 60% below the initial urea addition of 51 kg/h—zone A) to a production load of 30 t/h phosphate rock (i.e. an urea concentration of about 0.067 wt % based on the ore weight), in combination with ozone (at a reduced level compared to phase C and D). NOx emissions are similar as in the initial phase A (i.e. at about 60 ppm), while a $N_2O$ level of about 10 ppm and lower was observed.

These results clearly show that it is necessary to combine both urea and ozone to minimize both the NOx and $N_2O$ emissions. In particular, these results show the synergy between urea and ozone addition, wherein the advantages of the combined use of urea and ozone on the $N_2O$ and NOx emissions can be obtained at lower urea and ozone amounts, compared to when these compounds are used individually.

The invention claimed is:

1. A process for the reduction of mono-nitrogen oxides (NOx) from a gaseous effluent generated in the production of fertilizer comprising the acid digestion of phosphate ore in the presence of urea, wherein said gaseous effluent generated has a NOx composition of 70 to 100 mole % $NO_2$ and 0 to 30 mole % NO, comprising the steps of:
   a) contacting said gaseous effluent for 0.5 to 15 seconds with ozone, thereby providing a resultant gas mixture wherein NO and $NO_2$ present in the NOx are oxidized to higher nitrogen oxides; and;
   b) removing higher nitrogen oxides from said resultant gas mixture;
   wherein urea is added during said acid digestion of phosphate ore in an amount between 0.001 wt % and 0.25 wt % based on the weight of said phosphate ore; and;
   ozone is added to said gaseous effluent in an ozone/NOx ratio ranging between 0.5 and 1.4,
   wherein the resultant gas mixture has an NOx level of 20 to 80 ppm and an $N_2O$ level of less than 15 ppm.

2. The process according to claim 1, wherein step b) is performed using a wet scrubber.

3. The process according to claim 2, wherein said wet scrubber an aqueous acidic scrubber.

4. The process according to claim 1, wherein said higher nitrogen oxide comprises $N_2O_5$.

5. The process according to claim 1, wherein said gaseous effluent comprises sulphur oxides, water vapour, hydrogen fluoride, silicon tetrafluoride, nitric acid and/or carbon dioxide dust.

6. The process according to claim 1, wherein the scrubber in step b) is the only scrubber used for the removal of NOx from said gaseous effluent.

7. The process according to claim 1, wherein nitric acid or a salt thereof is formed in step b).

8. The process according to claim 1, wherein the temperature in step a) is at most 130° C.

9. The process according to claim 1, wherein a gas analyser measures the concentration of NOx in the gaseous effluent and regulates the amount of ozone added to the gaseous effluent in step a) on the basis of the NOx concentration measured.

10. The process according to claim 1 wherein urea is added during said acid digestion of phosphate ore in an amount between 0.005 wt % and 0.08 wt %, based on the weight of said phosphate ore.

11. A process for the reduction of mono-nitrogen oxides (NOx) from a gaseous effluent generated in the production of fertilizer comprising the acid digestion of phosphate ore in the presence of urea, wherein said gaseous effluent generated has a NOx composition of 70 to 100 mole % $NO_2$ and 0 to 30 mole % NO, comprising the steps of:

a) contacting said gaseous effluent for 0.5 to 15 seconds with ozone, thereby providing a resultant gas mixture wherein NO and $NO_2$ present in the NOx are oxidized to higher nitrogen oxides; and;

b) removing higher nitrogen oxides from said resultant gas mixture;

wherein urea is added during said acid digestion of phosphate ore in an amount between 0.005 wt % and 0.07 wt % based on the weight of said phosphate ore; and;

ozone is added to said gaseous effluent in an ozone/NOx ratio ranging between 0.5 and 1.4, and wherein the resultant gas mixture has a NOx level of less than 90 ppm and an $N_2O$ level of less than 15 ppm.

12. The process of claim 11 wherein the urea is added in an amount between 0.02 to 0.06 wt %.

13. The process of claim 12 wherein the urea is added in an amount between 0.02 to 0.05 wt %.

14. A process for the removal of mono-nitrogen oxides (NOx) from gaseous effluents in the production of fertilizer, the process comprising digesting phosphate ore with acid, thereby forming a digesting mixture and gaseous effluents; adding urea to the digesting mixture; and adding ozone to the gaseous effluents, wherein the gaseous effluents generated in the production of fertilizer have a NOx composition of 70 to 100 mole % $NO_2$ and 0 to 30 mole % NO, and wherein urea is added in the digesting mixture in an amount between 0.001 wt % and 0.07 wt % based on the weight of said phosphate ore.

15. The process according to claim 14, wherein ozone is used in a molar ratio of ozone over NOx in the gaseous effluent of 0.5 to 1.4.

* * * * *